Patented Apr. 4, 1939

2,153,012

UNITED STATES PATENT OFFICE 2,153,012

NEW ANTHRAQUINONE DYESTUFFS

William Wyndham Tatum, Grangemouth, Scotland, assignor to Imperial Chemical Industries Limited, a corporation of Great Britain No Drawing. Application September 8, 1937, Serial No. 162,952. In Great Britain September 17, 1936

3 Claims. (Cl. 260—296)

This invention relates to anthraquinone dyestuffs, more particularly to anthraquinone dyestuffs for colouring acetate artificial silks.

This invention has as an object to provide new anthraquinone dyestuffs. A further object is to devise a method of manufacturing new anthraquinone dyestuffs. A still further object is to provide new anthraquinone dyestuffs which have excellent fastness to light, washing, acids, and burnt coal gas fumes.

These objects are accomplished by the following invention. I have found that I can make new anthraquinone dyestuffs by interacting halogenoalkylaminoanthraquinones with tertiary nitrogen bases. The resulting dyestuffs are quaternary anthraquinonyl aminoalkylammonium salts.

The following examples, in which parts are by weight, illustrate, but do not limit the invention.

Example 1

7 parts of 1-anilino-4-β-chloroethylaminoanthraquinone (made as described below) are boiled under reflux for 9 hours with 20 parts of pyridine and the residual pyridine then removed by steam distillation. After filtering cold, the dyestuff is precipitated by adding sodium chloride to the aqueous filtrates, filtered and dried. The dry product dissolves in either water or dilute aqueous sodium hydroxide solution with a reddish-blue colour. The aqueous solution gives a reddish-blue precipitate with hydrochloric acid. Its solution in 96% sulphuric acid is reddish-blue, changing to green on addition of formaldehyde. It has the probable constitution

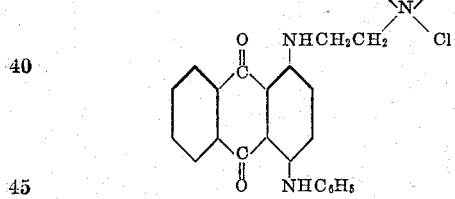

It dyes acetate artificial silk in blue shades.

1 - anilino - 4 - β - chloroethylaminoanthraquinone is obtained by reacting 4-bromo-1-β-hydroxyethylaminoanthraquinone and aniline, and treating the resulting 1-anilino-4-β-hydroxyethylaminoanthraquinone with thionyl chloride.

Example 2

10 parts of 1-methylamino-4-β-chloroethylaminoanthraquinone (made as described below) are boiled for 3 hours with 25 parts of pyridine. The product is filtered, residual pyridine removed by steam distillation, the resulting aqueous solution filtered from insoluble matter and the filtrate evaporated to dryness. The dry product is blue and dissolves in water with a bright blue colour, which changes to red upon addition of hydrochloric acid, and which gives a blue precipitate on addition of dilute aqueous sodium hydroxide solution. Its solution in 96% sulphuric acid is almost colourless. It has the following probable constitution

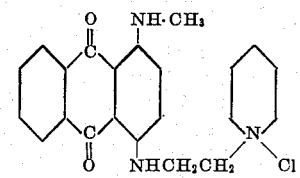

1 - methylamino - 4 - β - chloroethylaminoanthraquinone is made by heating 1-methylamino-4-β-hydroxyethylaminoanthraquinone with thionyl chloride in nitrobenzene.

Example 3

100 parts of acetate artificial silk are entered into a bath made by dissolving 2 parts of the pyridinium chloride from pyridine and 1-methylamino - 4 - β - chloroethylaminoanthraquinone (made as described in Example 2) in 3000 parts of water. The temperature is raised to 80° C. and the material worked for 1 hour at this temperature, then rinsed and dried. It dyes in bright blue shades of excellent fastness to light and washing.

Example 4

8 parts of 1-β-chloroethylaminoanthraquinone (made as described below) are heated at 110–120° C. for 3 hours with 24 parts of pyridine. The resulting product is filtered off cold, washed with benzene, dissolved in water, the aqueous solution filtered to remove insoluble matter, and the filtrate evaporated to dryness. The dry product is a red powder, which dissolves in water with a red colour, which is only slightly altered by the addition of hydrochloric acid or of dilute aqueous sodium hydroxide solution. It dyes acetate artificial silk in bright red shades. It has the probable constitution

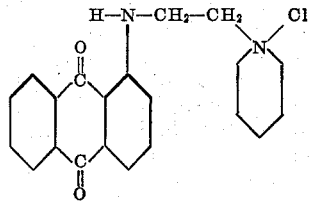

1-β-chloroethylaminoanthraquinone is made by heating 1-β-hydroxyethylaminoanthraquinone with thionyl chloride in nitrobenzene.

Example 5

9 parts of 1-methylamino-4-β-chloroethylaminoanthraquinone are heated in an autoclave for 14 hours at 125° C. with a solution of 9 parts of triethylamine in 60 parts of nitrobenzene. The nitrobenzene and residual triethylamine are removed by steam distillation, the resulting aqueous solution is filtered to remove insoluble matter, and the filtrate is evaporated to dryness. The dry product, which has the probable constitution

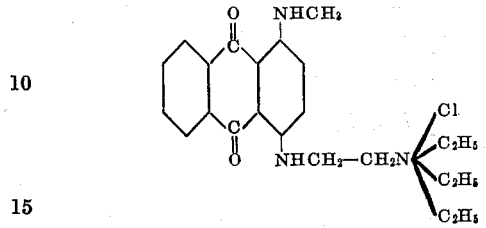

gives a colourless solution in 96% sulphuric acid and a red solution in 60% sulphuric acid; these solutions turn blue upon the addition of formaldehyde. It dyes acetate artificial silk in pure blue shades.

Example 6

8.4 parts of 1-methylamino-4-β-bromoethylaminoanthraquinone (made as described below), 84 parts of toluene, and 25 parts of trimethylamine are heated in an autoclave for 1 hour at 95° C. The reaction mixture is steam distilled to remove the toluene and residual trimethylamine and the resultant aqueous solution filtered cold to remove insoluble matter. The filtrate is evaporated to dryness. The dry product is obtained as a blue powder. It dissolves in water and in dilute aqueous sodium hydroxide solution with a violent-blue colour, and in dilute hydrochloric acid with a violet-red colour. In 96% sulphuric acid it gives an almost colourless solution, which changes to greenish-blue upon addition of formaldehyde. It dyes acetate artificial silk in bright reddish-blue shades. It has the probable constitution

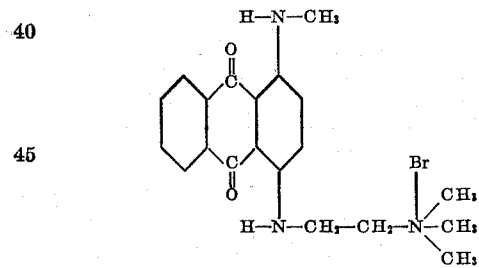

1-methylamino-4-β-bromoethylaminoanthraquinone is made by reacting phosphorus pentabromide and 1-methylamino-4-β-hydroxyethylaminoanthraquinone in nitrobenzene solution.

Example 7

12 parts of 1-β-chloroethylamino-8-β-hydroxyethylaminoanthraquinone (made as described below) are boiled for 17 hours with 24 parts of pyridine and the excess of pyridine is then removed by steam distillation. The resulting aqueous solution is filtered and the filtrate evaporated to dryness. The product dissolves in water with a reddish-violet colour. It dyes acetate artificial silk in reddish-violet shades. It has the probable constitution

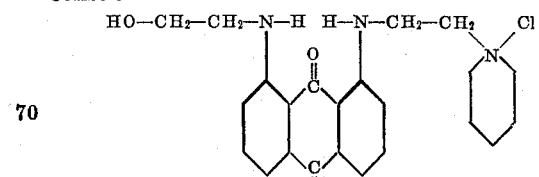

1-β-chloroethylamino- 8 -β-hydroxyethlamino-anthraquinone is made by reacting 1 molecule of thionyl chloride with 1 molecule of 1:8-di-(β-hydroxyethylamino)anthraquinone in nitrobenzene solution.

Example 8

10 parts of 1:4-di(1-chloro-β-hydroxypropylamino)anthraquinone (made as described in specification No. 11,930/1909) were boiled for 12 hours with 25 parts of pyridine, and the reaction mixture then filtered cold. The filter cake is steam distilled, the resulting aqueous solution is filtered cold to remove any insoluble matter, and the filtrate evaporated to dryness. The product is a blue powder of the following probable constitution:

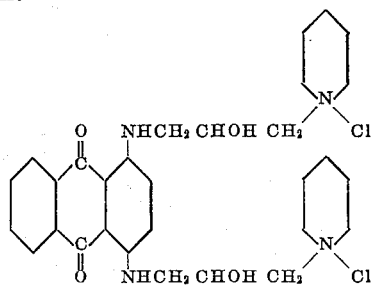

It dissolves in water with a violet-blue colour, which changes to brownish-red if hydrochloric acid is added or to a pure blue if dilute aqueous sodium hydroxide solution is added. It dissolves in 96% sulphuric acid to an almost colourless solution, which becomes greenish-blue upon addition of formaldehyde.

Example 9

10 parts of 4-bromo-1-β-chloroethylaminoanthraquinone (made as described below) and 30 parts of pyridine are boiled under reflux for 20 hours. The residual pyridine is removed by steam distillation, the resulting red solution is filtered cold to remove traces of insoluble matter and the filtrate evaporated to dryness. The dry product dissolves in water with a red colour, which is not altered by the addition of either hydrochloric acid or dilute aqueous sodium hydroxide solution. It dissolves in 96% sulphuric acid to an almost colourless solution, which becomes a deep violet-blue upon addition of formaldehyde. It dyes acetate artificial silk in yellowish-red shades. It has the probable constitution

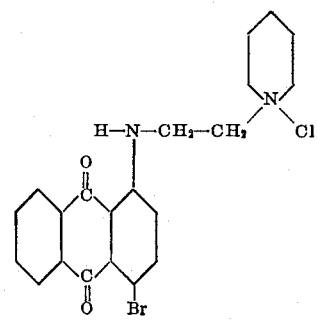

4-bromo-1-β-chloroethylaminoanthraquinone is obtained by heating together thionyl chloride and 4-bromo-1-β-hydroxyethylaminoanthraquinone at 60–70° C. in nitrobenzene solution.

Example 10

6 parts of 1-amino-4-β-chloroethylamino-2-methylanthraquinone (obtained as described below) and 15 parts of pyridine are heated for 22 hours at 115° C. under reflux. The residual pyridine is removed by steam distillation and the resulting aqueous solution filtered cold to remove insoluble matter. The filtrate is evaporated to dryness. The dry product dissolves in water with a violet colour, which is not altered by the addition of aqueous sodium hydroxide solution but which changes to red upon adding hydrochloric acid. Its solution in 96% sulphuric acid is pale red, changing to a pure blue upon adding formaldehyde. It dyes acetate artificial silk in violet shades. It has the probable constitution

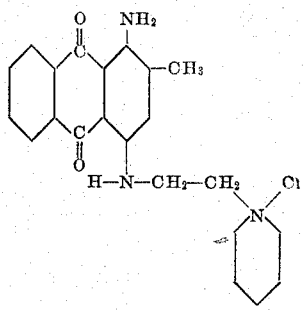

1-amino-4-β-chloroethylamino - 2 - methylanthraquinone is made by reacting 1-amino-4-β-hydroxyethylamino-2-methylanthraquinone with thionyl chloride.

The new quaternary anthraquinonylaminoalkylammonium salts may carry substituents in the anthraquinone nucleus, for example halogen atoms and methyl, hydroxy, amino and substituted amino groups. The alkyl which may be for example, ethyl, propyl, or butyl may carry one or more hydroxy substituents. The tertiary bases may be acyclic, as for example, trimethylamine, triethylamine, and methyldiethylamine, or homocyclic, as for example dimethylaniline and diethylaniline, or heterocyclic, as for example, pyridine, picolines, quinoline and quinaldine. Pyridine is one of the most convenient tertiary bases to use.

The new dyestuffs are soluble in water. From their aqueous solution acetate artificial silk is dyed in bright shades, which have excellent fastness to light, washing, acids and burnt coal gas fumes. The fastness to burnt coal gas fumes is an important feature, as many otherwise satisfactory acetate artificial silk dyestuffs are deficient in this respect. Lack of fastness to burnt coal gas fumes is an especial disadvantage when the dyed goods are stored in warehouses or other places where coal gas is used for heating and/or lighting purposes. In respect of fastness to burnt coal gas fumes the dyestuffs are superior to the corresponding known hydroxyethylaminoanthraquinone dyestuffs. The dyestuffs will also print acetate artificial silk.

As many apparently widely different embodiments of this invention may be made without departing from the spirit and scope thereof, it is to be understood that I do not limit myself to the specific embodiments thereof except as defined in the appended claims.

I claim:

1. As new compounds, the quaternary anthraquinonylaminoalkylammonium salts in which the ammonium nitrogen atom is attached directly to the omega carbon atom of the alkyl chain, which alkyl side chain is of the class consisting of unsubstituted alkyl chains and hydroxy substituted alkyl chains containing from 2 to 4 carbon atoms, said compounds being relatively water soluble and having affinity for cellulose acetate fibers.

2. As new compounds, the quaternary anthraquinonylaminoalkylammonium salts in which the alkyl chain is unsubstituted and contains from 2 to 4 carbon atoms and in which the nitrogen atom is attached to the omega carbon atom of the alkyl side chain, said compounds being water soluble and having affinity for cellulose acetate fibers.

3. The quaternary anthraquinonylaminoalkylammonium salt of the following general formula

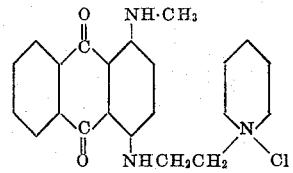

WILLIAM WYNDHAM TATUM.